(12) United States Patent
Kim et al.

(10) Patent No.: US 8,932,526 B2
(45) Date of Patent: Jan. 13, 2015

(54) APPARATUS FOR GENERATING PERFUME FOR VEHICLES

(75) Inventors: Jae Ho Kim, Daejeon (KR); Ki Hong Kim, Daejeon (KR); Eun Gi Min, Daejeon (KR); Dong Suk Lee, Daejeon (KR); Ji-Yong Park, Daejeon (KR); Yong Jun Jee, Daejeon (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 224 days.

(21) Appl. No.: 13/599,192

(22) Filed: Aug. 30, 2012

(65) Prior Publication Data

US 2013/0056559 A1 Mar. 7, 2013

(30) Foreign Application Priority Data

Sep. 5, 2011 (KR) .................. 10-2011-0089467
Sep. 14, 2011 (KR) .................. 10-2011-0092377
Jan. 4, 2012 (KR) .................. 10-2012-0000872

(51) Int. Cl.
*A61L 9/00* (2006.01)
*B60H 3/00* (2006.01)

(52) U.S. Cl.
CPC ...... *B60H 3/0021* (2013.01); *B60H 2003/0064* (2013.01)
USPC .................................................. 422/124

(58) Field of Classification Search
CPC ............. A61L 9/04; A61L 9/12; A61L 9/122; A61L 9/125
USPC ........................................ 422/120, 123, 124
See application file for complete search history.

(56) References Cited

U.S. PATENT DOCUMENTS 6,713,024 B1 * 3/2004 Arnell et al. .................. 422/124

FOREIGN PATENT DOCUMENTS

| JP | 1994-032126 | 4/1994 |
|----|----|----|
| JP | H0632126 | 4/1994 |
| JP | 2004-0121594 | 4/2004 |
| JP | 2010-179786 | 8/2010 |
| KR | 1997-0011445 | 1/1996 |
| KR | 2010-0027180 | 3/2010 |
| KR | 2011-0003848 | 1/2011 |

OTHER PUBLICATIONS

European Search Report issued on corresponding European patent application No. 12 006 190.8.

* cited by examiner

*Primary Examiner* — Sean E Conley
*Assistant Examiner* — Donald Spamer
(74) *Attorney, Agent, or Firm* — Lowe Hauptman & Ham, LLP

(57) ABSTRACT

Provided is an apparatus for generating perfume for vehicles, and more particularly, an apparatus for generating perfume for vehicles capable of simplifying a configuration and increasing sealing ability to stably control perfume, by easily controlling a flow of air passing through a first perfume generating part and a second perfume generating part using a single rotating shaft.

14 Claims, 17 Drawing Sheets

US 8,932,526 B2

APPARATUS FOR GENERATING PERFUME FOR VEHICLES

CROSS-REFERENCE TO RELATED APPLICATIONS

This application claims priority under 35 U.S.C. §119 to Korean Patent Application Nos. 10-2011-0089467 filed on 5 Sep. 2011, 10-2011-0092377 filed on 14 Sep. 2011 and 10-2012-0000872 filed on 4 Jan. 2012 in the Korean Intellectual Property Office, the disclosure of which is incorporated herein by reference in its entirety.

TECHNICAL FIELD

The following disclosure relates to an apparatus for generating perfume for vehicles, and more particularly, to an apparatus for generating perfume for vehicles capable of simplifying a configuration and increasing sealing ability to stably control perfume, by easily controlling a flow of air passing through a first perfume generating part and a second perfume generating part using a single rotating shaft.

BACKGROUND

Generally, an air conditioner for a vehicle maintains inside vehicle an optimal temperature during the summer and winter or removes frost, and the like, settled on the window of a vehicle during rainy or winter so as to secure a clear front and rear view for a driver.

FIG. 1 is a cross-sectional view showing an example of an air conditioner for a vehicle. An air conditioner for a vehicle according to the related art is configured to include an air conditioning case 10 provided with vents 11, 12, and 13 of which the opening degree is controlled by each of the doors 11d, 12d, and 13d; a blowing part 14 connected to an inlet of the air conditioning case 10 to blow external air; an evaporator E and a heater core H mounted in the air conditioning case 10; and a temperature door 15 controlling an opening degree of a cold air passage P1 and a hot air passage P2 of the air conditioning case 10.

That is, the air conditioner is an apparatus that performs a heat exchange with introduced external air so as to be at an optimal temperature and then distributes the air in several directions inside a vehicle. However, when external air including various harmful substances such as dust, smoke gases, and the like, generated from a road due to environmental pollution is introduced, the external air passes through the air conditioner and is then delivered to the inside of a vehicle indoor as it is.

Further, when bacterial foreign materials such as mildew accumulate in the air conditioner, and the like, exist, these bacterial foreign materials may also be delivered to the inside of a vehicle.

In order to solve the above problems, various types of apparatuses for generating perfume have been proposed. As one example, Japanese Utility Model Laid-Open Publication No. 1994-032126 (Entitled: Apparatus for generating perfume for vehicles) is shown in FIG. 1.

An apparatus 1 for generating perfume for vehicles is applied to an air conditioner 2 for vehicles that includes a blowing duct 3 of which the opening degree is controlled by each door 12d, 13d, and 14d and guiding blowing air to each vent 12, 13, and 14 communicating with a vehicle indoor; a blowing part 4 mounted in the blowing duct 3; an evaporator 5 and a heat core 6 mounted in the blowing duct 3 and is configured to include a first communicating passage 18 connected at a downstream side of the blowing part 4 in the blowing duct 3; a second communicating passage 19 connected at a downstream side of the heater core 6; perfume containers 15, 16, and 17 mounted between the first communicating passage 18 and the second communicating passage 19 and having perfume received therein; and a control part 25 including control valves 21, 22, and 24 to control a supply of perfume component within the perfume containers 15, 16, and 17.

The apparatus for generating perfume for vehicles can supply a mixture of the perfume component jetted into the blowing duct and air supplied through the blowing part.

However, the apparatus for generating perfume for vehicles is configured to use the plurality of control valves and therefore, cannot easily perform a control.

Therefore, a need exists for an apparatus capable of easily controlling discharged perfume with a simple operation while having a simple configuration and excellent productivity and sealing ability.

PRIOR ART DOCUMENT

Patent Document

Japanese Utility Model Laid-Open Publication No. 1994-032126 (Laid-Open Publication Date: Apr. 26, 1994)

SUMMARY

An exemplary embodiment of the present invention is directed to providing an apparatus for generating perfume for vehicles capable of simplifying a configuration and increasing sealing ability to stably control perfume, by easily controlling a flow of air passing through a first perfume generating part and a second perfume generating part using a single rotating shaft.

In detail, an exemplary embodiment of the present invention is directed to providing an apparatus for generating perfume for vehicles capable of opening and closing a first door to a fourth door by a rotation of a rotating shaft.

Further, an exemplary embodiment of the present invention is directed to providing an apparatus for generating perfume for vehicles capable of increasing sealing ability, by including a door seating member, mounting a first sealing member on a surface on which a first door to a fourth door contact the door seating member, and mounting a second sealing member under a first channel to a fourth channel.

In addition, an exemplary embodiment of the present invention is directed to providing an apparatus for generating perfume for vehicles capable of smoothing an introduced flow of air introduced through an inlet pipe and a discharged flow of air discharged through an outlet pipe and reducing a pressure drop of air, by mounting the inlet pipe and the outlet pipe on a corresponding cover above a rotating shaft and forming a plate-shaped guide member on a rotating shaft.

Moreover, an exemplary embodiment of the present invention is directed to providing an apparatus for generating perfume for vehicles capable of smoothing an introduced flow of air by reducing a pressure drop of air introduced through an inlet pipe, reducing a pressure drop of air, and reducing a difference in intensity of two perfumes perfumed through a first perfume generating part and a second perfume generating part, and increasing the overall air volume, by mounting an inlet pipe over a cover.

Also, an exemplary embodiment of the present invention is directed to providing an apparatus for generating perfume for vehicles capable of easily changing a type of perfume and easily replacing perfume according to a user's taste, by detachably forming a lower portion of a body due to a lower cover and forming a first perfume generating part and a second perfume generating part in a cartridge form.

In one general aspect, an apparatus 1000 for generating perfume for vehicles includes: a body 100 having a first perfume generating part 110 and a second perfume generating part 120 embedded in parallel therein, an upper one portion of the first perfume generating part 110 is provided with a first hole 111 and the upper other portion thereof is provided with a second hole 112 and an upper one portion of the second perfume generating part 120 is provided with a third hole 121 and a fourth hole 120; an air channel forming part 130 including a first channel 131 communicating with a first hole 111 of the first perfume generating part 110, a second channel 132 communicating with a second hole 111 of the first perfume generating part 110, a third channel 133 communicating with a third hole 121 of the second perfume generating part 120, and a fourth channel 134 communicating with a fourth hole 122 of the second perfume generating part 120; an opening and closing means 200 including a first door 210 to a fourth door 240 each opening the first channel 131 to the fourth channel 134 and a single rotating shaft 250 controlling an opening and closing of the first door 210 to the fourth door 240.

The apparatus 1000 for generating perfume for vehicles may further include: a cover 400 fastened with the body 100 and including a first space part 401 communicating the first channel 131 and the third channel 133 and a second space part 402 communicating with the second channel 132 and the fourth channel 134 partitioned thereon.

The cover 400 may be provided with an inlet pipe 510 and an outlet pipe 520 each connected to the first space part 401 and the second space part 402 so as to introduce and discharge air.

The air channel forming part 130 may be provided with an inclined part 141 to be inclined between the first perfume generating part 110 and the second perfume generating part 120 as upper sections of the first channel 131 to the fourth channel 134 go downwardly.

The air channel forming part 130 may be protrudedly provided with a partition part 142 partitioning a space in which the first space part 401 and the second space part 402 communicate with each other, upwardly from the inclined part 141.

The opening and closing means 200 may be provided with a door seating member 260 that is mounted between the air channel forming part 130 and the first door 210 to the fourth door 240 so as to correspond to an upper portion of the air channel forming part 130 provided with the inclined part 141 and the partition part 142 and may be provided with a first communicating hole 261 communicating with the first channel 131, a second communicating hole 262 communicating with the second channel 132, a third communication hole 263 communicating with the third channel 133, and a fourth communicating hole 264 communicating with the fourth channel 134.

In this case, the door seating member 260 may be formed of a rubber material.

A plate-shaped first sealing member 202 may be integrally formed on a surface on which the first door 210 to the fourth door 240 each contact the door seating member 260.

The first door 210 to the fourth door 240 are interposed with a spring 201 maintained to open the first channel 131 to the fourth channel 134.

The opening and closing means 200 may open and close the first door 210 to the fourth door 240 by the rotation of the rotating shaft 250 by forming a first opening and closing part 251 simultaneously closing the first door 210 and the third door 230 and a second opening and closing part 252 simultaneously closing the second door 220 to the fourth door 240 each on the rotating shaft 250 in parallel in a fan shape.

The spring 201 may be maintained to close the first channel 131 to the fourth channel 134 and the opening and closing means 200 may include a connection member 204 connecting the rotating shaft 250 with the first door 210 to the fourth door 240 to open and close the first door 210 to the fourth door 240 by the rotation of the rotating shaft 250.

The first opening and closing part 251 simultaneously closing the first door 210 and the third door 230 and the second opening and closing part 252 simultaneously closing the second door 220 to the fourth door 240 may be each formed on the rotating shaft 250 in parallel in a fan shape.

The first door 210 to the fourth door 240 may be protrudedly provided with guide parts 203 guiding a movement of the first opening and closing part 251 or the second opening and closing part 252 according to the rotation of the rotating shaft 250.

The inlet pipe 510 may be located at a center of the first space part 401 corresponding to an upper portion of the rotating shaft 250.

The outlet pipe 520 may be formed on a surface adjacent to the second channel 132 of the second space part 402 in a side of the cover 400, and the inlet pipe 510 may be formed to be smaller than the outlet pipe 520.

The outlet pipe 520 may be located at a center of the second space part 402 corresponding to the upper portion of the rotating shaft 250, and the inlet pipe 510 and the outlet pipe 520 may be formed at the same size.

The opening and closing means 200 may be provided with a pair of guide members 253 in a plate shape protruded to both sides of the rotating shaft 250 corresponding to the inlet pipe 510 or the outlet pipe 520 so as to guide the flow of air introduced from the inlet pipe 510 or air discharged to the outlet pipe 520.

The body 100 may have an opened lower portion and the first perfume generating part 110 and the second perfume generating part 120 may be replaceably formed in a cartridge form through the opened lower portion of the body 100.

The apparatus 1000 for generating perfume for vehicles may further include: second sealing members 101 formed on each of the lower portions of the first channel 131 to the fourth channel 134 contacting the first hole 111 to the fourth hole 122 of the air channel forming part 130.

[Detailed Description of Main Elements]

Figure 1:
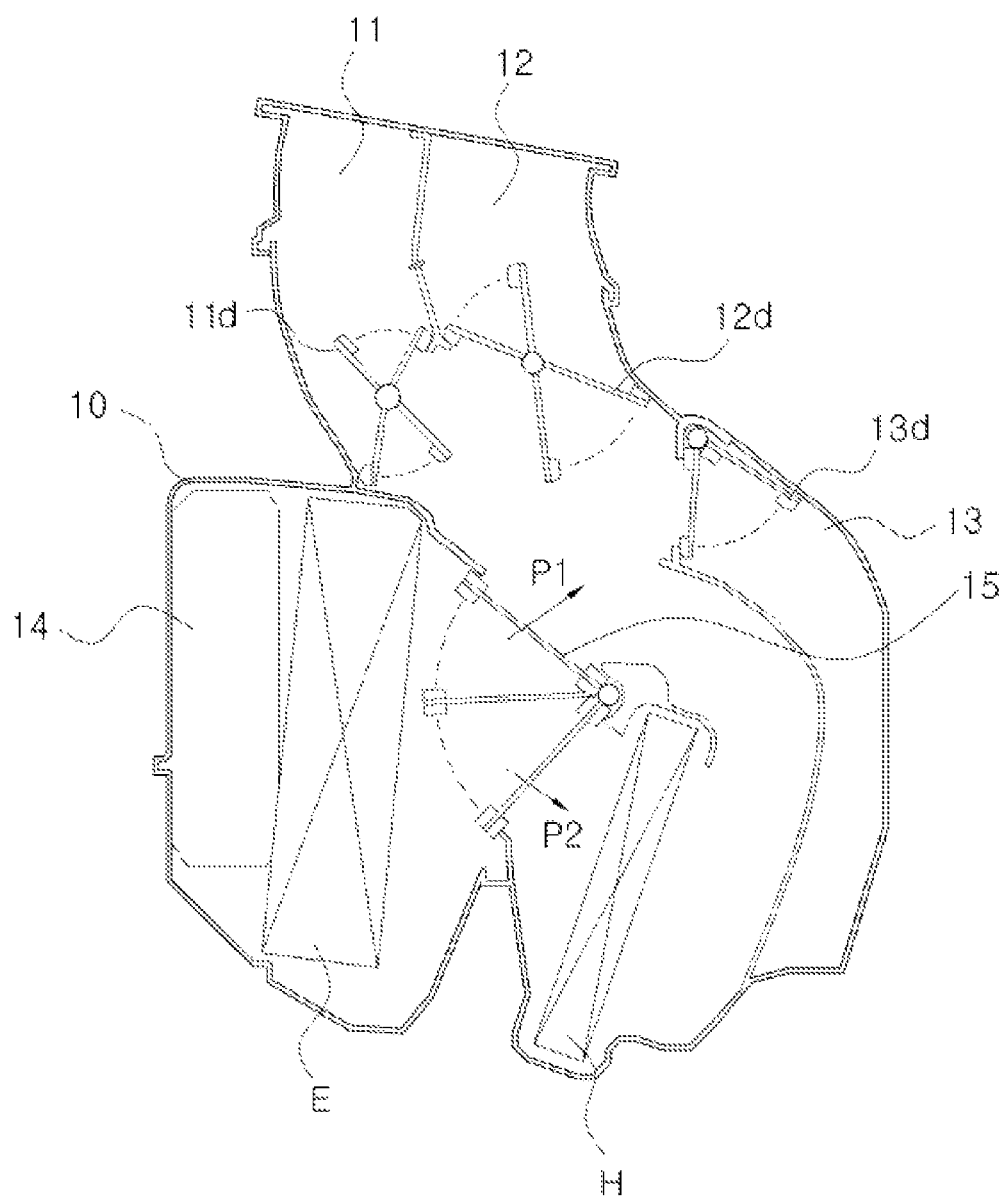
FIG. 1 is a diagram showing an air conditioner for a vehicle according to the related art.
Figure 2:
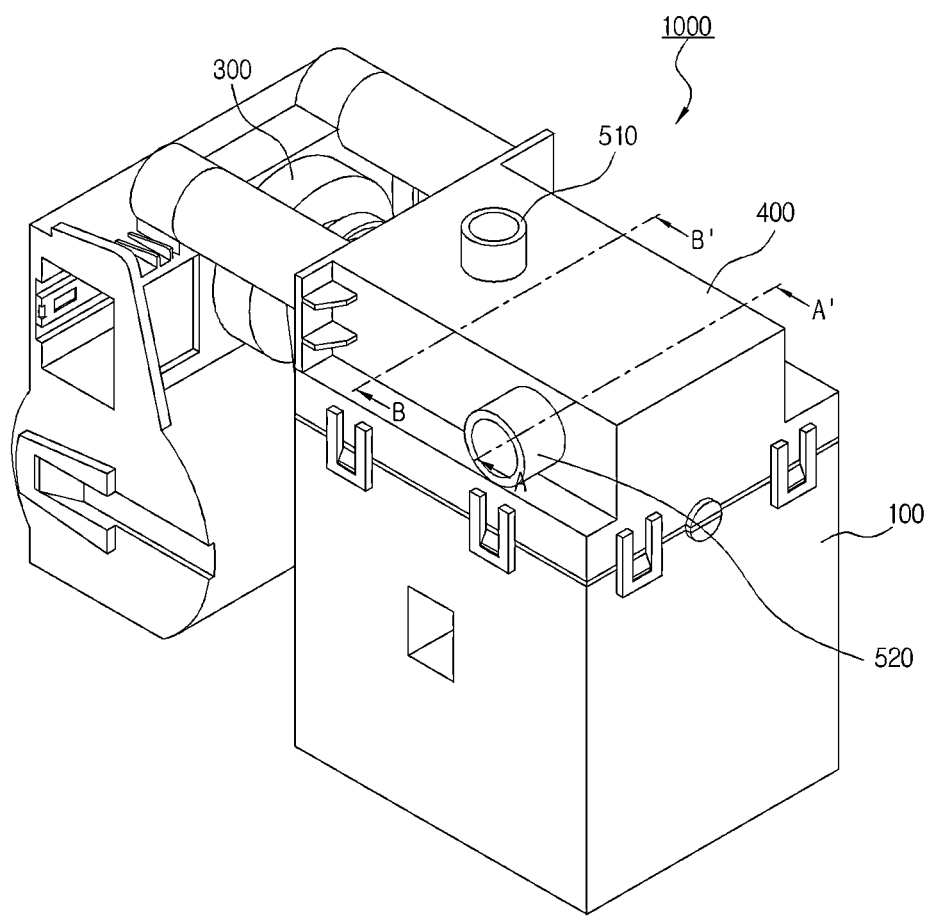
FIGS. 2 to 5 are a perspective view, an exploded perspective view, a cross-sectional view taken along AA', and a cross-sectional view taken along BB' of an apparatus for generating perfume for vehicles according to an exemplary embodiment of the present invention.

| | |
|---|---|
| 1000: Apparatus for generating perfume for vehicles | |
| 100: Body | |
| 101: Second sealing member | |
| 110: First perfume generating part | 111: First hole |
| 112: Second hole | |
| 120: First perfume generating part | 121: Third hole |
| 122: Fourth hole | |
| 130: Air channel forming part | 131: First channel |
| 132: Second channel | 133: Third channel |
| 134: Fourth channel | |
| 141: Inclined part | 142: Partitioning part |
| 200: Opening and closing means | 201: Spring |
| 202: First sealing member | 203: Guide part |
| 204: Connection member | |
| 210: First door | |
| 220: Second door | 230: Third door |
| 240: Fourth door | 250: Rotating shaft |
| 251: First opening part | |
| 252: Second opening part | |
| 260: Door seating member | |
| 261: First communicating hole | |
| 262: Second communicating hole | |
| 263: Third communicating hole | |
| 264: Fourth communicating hole | |
| 300: Driving means | |
| 400: Cover | 401: First space part |
| 402: Second space part | 420: Baffle |
| 510: Inlet pipe | 520: Outlet pipe |

DETAILED DESCRIPTION OF EMBODIMENTS

Hereinafter, an apparatus for generating perfume for vehicles 1000 according to exemplary embodiments of the present invention having the above-mentioned characteristics will be described in more detail with reference to the accompanying drawings.

The apparatus 1000 for generating perfume for vehicles according to the exemplary embodiment of the present invention is configured to include a body 100, an air channel forming part 130, an opening and closing means 200, a driving means 300, a cover 400, an inlet pipe 510, and an outlet pipe 520.

The body 100 is a basic body 100 forming the apparatus 1000 for generating perfume for vehicles according to the exemplary embodiment of the present invention and includes a first perfume generating part 110 and a second perfume generating part 120 emanating perfume embedded therein.

Figure 3:
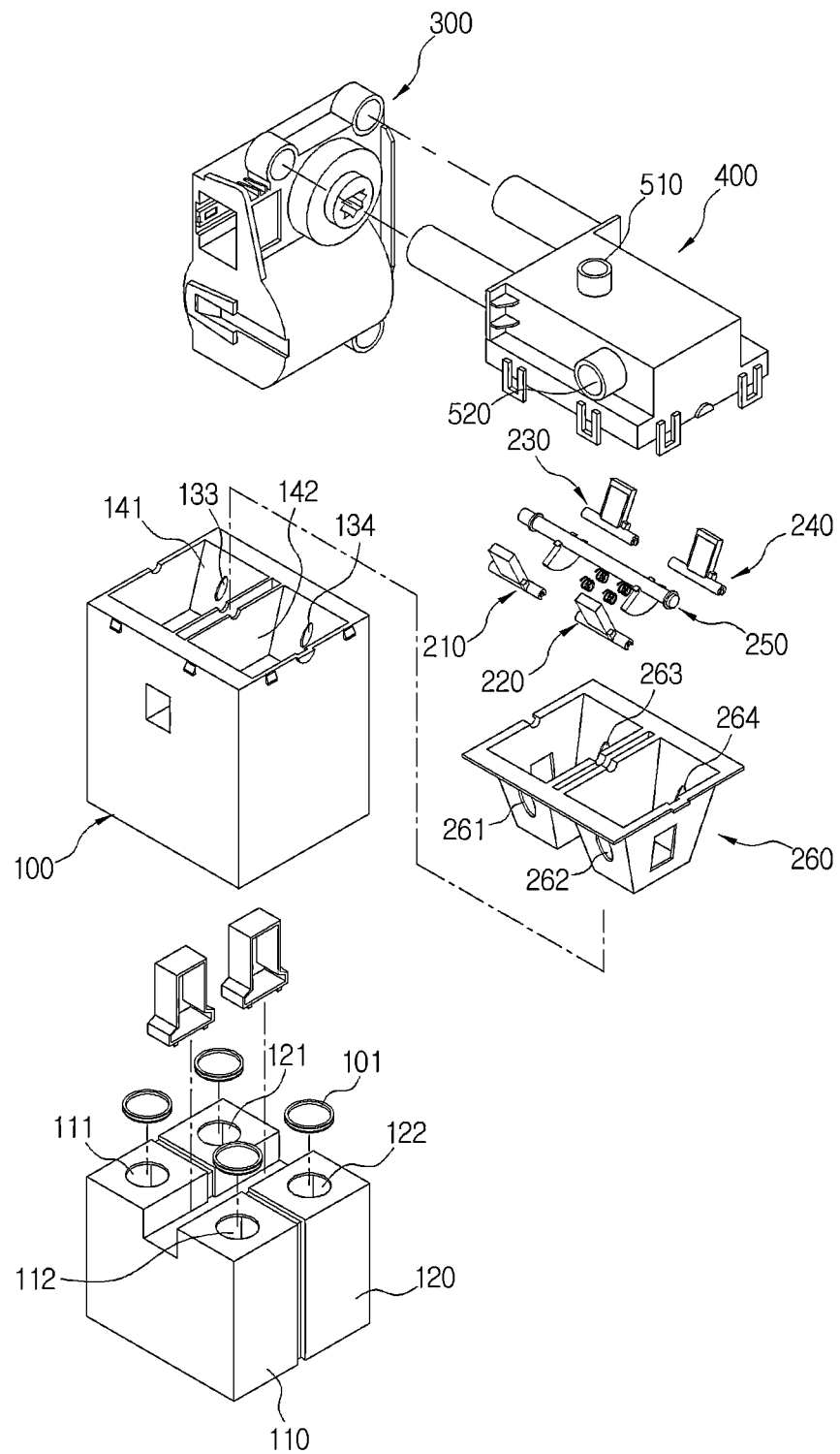

In FIG. 3, the first perfume generating part 110 and the second perfume generating part 120 are extended in a horizontal direction and are mounted in parallel to form two columns.

In this configuration, an upper one portion of the first perfume generating part 110 is provided with a first hole 111 and the upper other portion thereof is provided with a second hole 112 and the upper one side of the second perfume generating part 120 is provided with a third hole 121 and the upper other portion thereof is provided with a fourth hole 122.

The first hole 111 and the second hole 112 introduces air into the first perfume generating part 110 or discharges internal air to the outside and the third hole 121 and the fourth hole 122 introduces air into the second perfume generating part 120 or discharges the internal air to the outside.

In order to facilitate a flow of air through the first hole 111 to the fourth hole 122, the first perfume generating part 110 and the second perfume generating part 120 are located so that the first hole 111 and the third hole 121 are symmetrical with the second hole 112 and the fourth hole 122.

The air channel forming part 130 is formed above a portion in which the first perfume generating part 110 and the second perfume generating part 120 are mounted and is configured to include a first channel 131 communicating with the first hole 111 of the first perfume generating part 110, a second channel 132 communicating with the second hole 112 of the first perfume generating part 110, a third channel 133 communicating with the third hole 121 of the second perfume generating part 120, and a fourth channel 134 communicating with the fourth hole 122 of the second perfume generating part 120.

That is, the air channel forming part 130 forms the first channel 131 to the fourth channel 134 so as to have an independent flow without mixing air supplied to the first perfume generating part 110, air discharged from the first perfume generating part 110, air supplied to the second perfume generating part 120, and air discharged from the second perfume generating part 120 with each other.

In this case, the body 100 may have a form in which the air channel forming part 130 is integrally formed therein and forms the air channel forming part 130 so as to save costs and can be changed in a design in various forms including a space in which the first perfume generating part 110 and the second perfume generating part 120 are embedded.

The opening and closing means 200 is a means that includes a first door 210 to a fourth door 240 each opening and closing the first channel 131 to the fourth channel 134 and a single rotating shaft 250 controlling the opening and closing of the first door 210 to the fourth door 240 and controls the operation of the first door 210 to the fourth door 240 by the operation of the rotating shaft 250 and controls the flow of air according to the opening and closing of the first door 210 to the fourth door 240.

In more detail, the first door 210 opens and closes the first channel 131, the second door 220 opens and closes the second channel 132, the third door 230 opens and closes the third channel 133, the fourth door 240 opens and closes the fourth channel 134, and the first door 210 to the fourth door 240 are controlled by the operation of the rotating shaft 250.

The exemplary embodiment of the present invention controls the operation of the first door 210 to the fourth door 240 using the single rotating shaft 250, thereby making it possible to save costs and improve productivity with a simple configuration.

The opening and closing means 200 according to the exemplary embodiment of the present invention may be implemented in various forms using the single rotating shaft 250 and the detailed form thereof will be again described below.

The driving means 300 is a means that is connected to the rotating shaft 250 of the opening and closing means 200 to drive the rotating shaft 250. As the driving means, a means such as an actuator may be used.

The cover 400 is fastened with the body 100 and is partitioned into a first space part 401 communicating with the first channel 131 and the third channel 133 and a second space part 402 communicating with the second channel 132 and the fourth channel 134.

In this configuration, the first space part 401 and the second space part 402 are formed so that the cover 400 form may partition two spaces or have a baffle 40 formed therein.

The drawing shows an example in which the baffle 420 is formed in the cover 400.

That is, the cover 400 seals the upper portion of the body 100 and is provided with the first space part 401 communicating with the first hole 111 of the first perfume generating part 110 and the third hole 121 of the second perfume generating part 120 and the second space part 402 communicating with the second hole 112 of the first perfume generating part 110 and the fourth hole 122 of the second perfume generating part 120.

The first space part 401 and the second space part 402 of the cover 400 each are provided with an inlet pipe 510 into which air is introduced and an outlet pipe 520 from which air is discharged.

In other words, the first space part 401 connected to the inlet pipe 510 is introduced with air such that the first door 210 and the third door 230 control the flow of air supplied to the first perfume generating part 110 or the second perfume generating part 120 and the outlet pipe 520 is connected to the second space part 402 to discharge air.

If the inlet pipe 510 and the outlet pipe 520 each communicate with the first space part 401 and the second space part 402, they may be formed at various locations of the cover 400.

FIGS. 2 to 11 show the apparatus 1000 for generating perfume for vehicles according to the exemplary embodiment of the present invention in which the inlet pipe 510 is formed at the center of the first space part 401 of the upper portion of the cover 400 and the outlet pipe 520 is formed at a surface adjacent to the second channel 132 of the second space part 402 in the side of the cover 400.

Describing the apparatus 1000 for generating perfume for vehicles according to the exemplary embodiment of the present invention as shown in FIGS. 2 to 11, the inlet pipe 510 is formed on the upper portion of the cover 400 and is located at the central area of the first space part 401, such that the air introduced through the inlet pipe 510 may be smoothly guided to the first channel 131 associated with the first perfume generating part 110 or the second channel 132 associated with the second perfume generating part 120.

The central area of the first space part 401 is a location corresponding to the upper portion of the rotating shaft 250. Herein, the apparatus 1000 for generating perfume for vehicles may have an advantage in that the inlet pipe 510 is located at the central area of the first space part 401 such that the air may be moved to the first perfume generating part 110 or the second perfume generating part 120 by the operation of the first door 210 or the third door 230 according to the control of the rotating shaft 250.

In this case, a size of the inlet pipe 510 may be formed to be smaller than that of the outlet pipe 520 to reduce the pressure drop of air.

The drawings show that the body 100 is protruded outwardly downwardly and the protrude portion of the body 100 is locked to the lower portion of the cover 400, which is only one exemplary embodiment. Therefore, the body 100 and the lower portion of the cover 400 may be fixed to each other by various fastening methods.

In this case, in the apparatus 1000 for generating perfume for vehicles according to the exemplary embodiment of the present invention, it is preferable to form an inclined part 141 on the upper portion of the air channel forming part 130 so as to easily control the opening and closing by the single rotating shaft 250.

Figure 4:
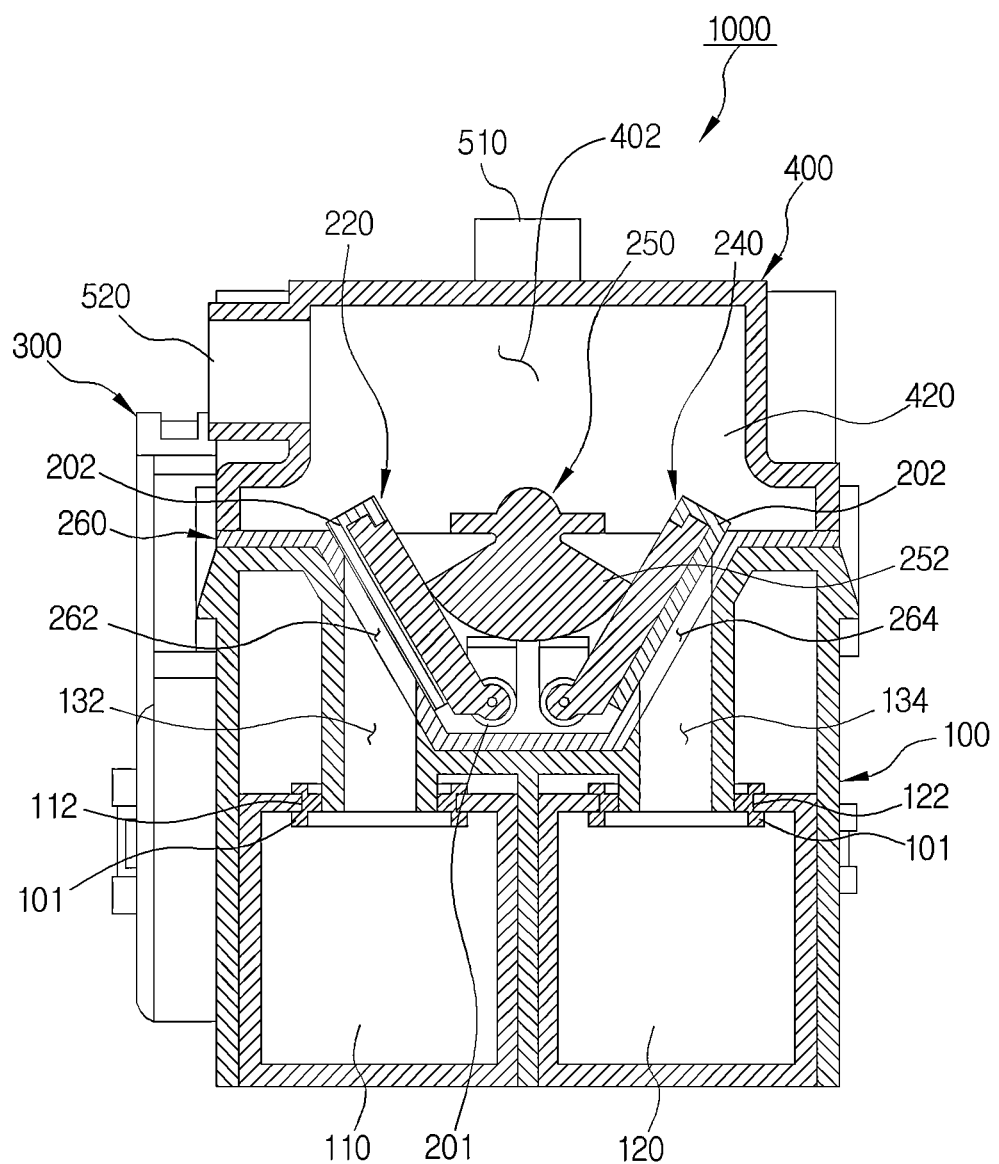
Figure 5:
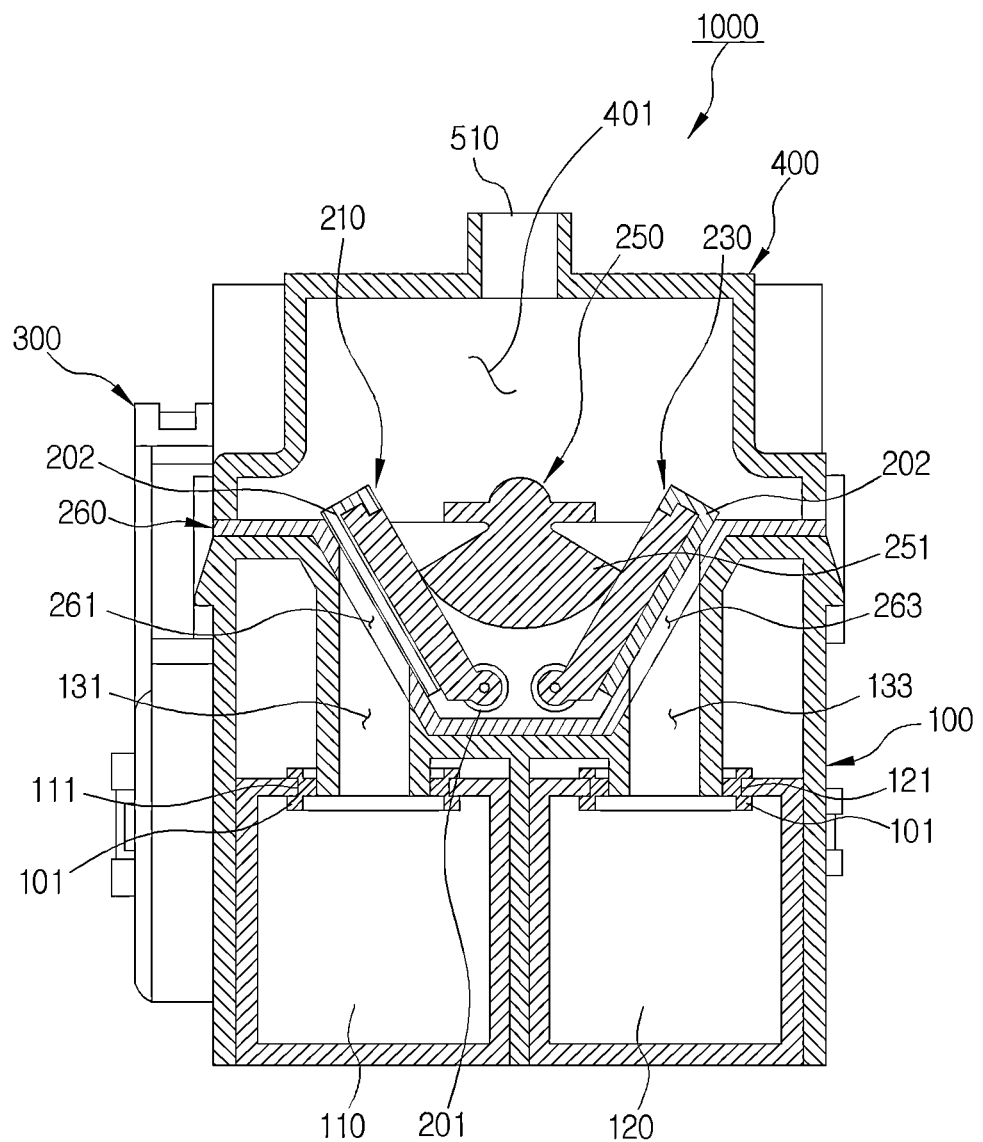

The upper portions of the first channel 131 to the fourth channel 134 are provided with inclined parts 141 and the air channel forming part 130 is formed to be inclined between the first perfume generating part 110 and the second perfume generating part 120 as a section of the inclined part 141 goes downwardly (see FIGS. 4 and 5).

That is, as shown in FIGS. 4 and 5, the inclined part 141 of the air channel forming part 130 is formed to be inclined toward a portion between the first perfume generating part 110 and the second perfume generating part 120 as it goes downwardly and thus, is formed to an appropriate "V"-letter shape like a section in the AA' direction.

Further, as the inclined part 141 is formed, the partitioning part 142 partitioning the space in which the first space part 401 and second space part 402 communicate with each other between the upper portion (the upper area of the inclined part 141 of the air channel forming part 130) of the body 100 and the cover 400 is protruded upwardly from the air channel forming part 130 to partition the introduced air and the discharged air.

The opening and closing means 200 may be formed in the space in which the inclined part 141 and the partition part 142 of the air channel forming part 130 are formed and may further include a door seating member 260 so as to increase the sealing ability.

The door seating member 260 is mounted between the air channel forming part 130 and the first door 210 to the fourth door 240 so as to correspond to the upper portion of the air channel forming part 130 provided with the inclined part 141 and the partition part 142 of the body 100 and is provided with a first communicating hole 261 communicating with the first channel 131, a second communicating hole 262 communicating with the second channel 132, a third communication hole 263 communicating with the third channel 133, and a fourth communicating hole 264 communicating with the fourth channel 134.

In this case, the door seating member 260 may be preferably formed of a rubber material and is preferably extended between the upper portion of the body 100 and the lower portion of the cover 400 to more increase the sealing ability.

The door seating member 260, the body 100, or the cover 400 is formed so as to be connected with the driving means 300 by protruding a predetermined area of the rotating shaft 250 to the outside.

The opening and closing means 200 is formed so that the first door 210 to the fourth door 240 open and close the first channel 131 to the fourth channel 134 and the first door 210 to the fourth door 240 are operated together by the rotation of the rotating shaft 250.

The opening and closing means 200 may be formed to have various forms. Meanwhile, FIGS. 2 to 8 show an example in which the opening and closing means 200 are formed to maintain the opened state by a spring 201 opening the first channel 131 to the fourth channel 134 and a first opening and closing part 251 and a second opening and closing part 252 in a fan shape are formed on the rotating shaft 250.

In addition, FIGS. 9 to 12 show an example in which the spring 201 maintained to close the first channel 131 to the fourth channel 134 is interposed and the rotating shaft 250 is connected with the first door 210 to the fourth door 240 by a connection member 204.

First, the form shown in FIGS. 2 to 8 will be described.

The first door 210 to the fourth door 240 is formed to maintain the opened state by the spring 201 maintained to open the first channel 131 to the fourth channel 134.

The opening and closing means 200 is formed so that the first door 210 to the fourth door 240 is formed to close the first channel 131 to the fourth channel 134 in an opposite direction to the elasticity of the spring 201 and is opened and closed by the rotation of the rotating shaft 250.

In more detail, the opening and closing means 200 opens and closes the first door 210 to the fourth door 240 by the rotation of the rotating shaft 250 by forming the first opening and closing part 251 that can simultaneously close the first door 210 and the third door 230 and the second opening and closing part 252 that can simultaneously close the second door 220 to the fourth door 240 on the rotating shaft 250 in a fan shape.

The first opening and closing part 251 and the second opening and closing part 252 are formed in parallel with each other while being spaced apart from each other in a length direction of the rotating shaft 250 and are operated together with the rotating shaft 250 and when the first opening and closing part 251 opens the first door 210 by the rotation of the rotating shaft 250, the second opening and closing part 252 also opens the second door 220 and closes the third door 230 and the fourth door 240.

Further, when the first opening and closing part 251 opens the third door 230 by the rotation of the rotating shaft 250, the second opening and closing part 252 also opens the fourth door 240 and closes the first door 210 and the second door 220.

The first opening and closing part 251 and the second opening and closing part 252 are formed to have the same form and when the first opening and closing part 251 and the second opening and closing part 252 are assembled with the body 100, have a fan shape having a size enough that the first opening and closing part 251 can simultaneously close the first door 210 and the third door 230 and the second opening and closing part 252 can simultaneously close the second door 220 and the fourth door 240.

Figure 6:
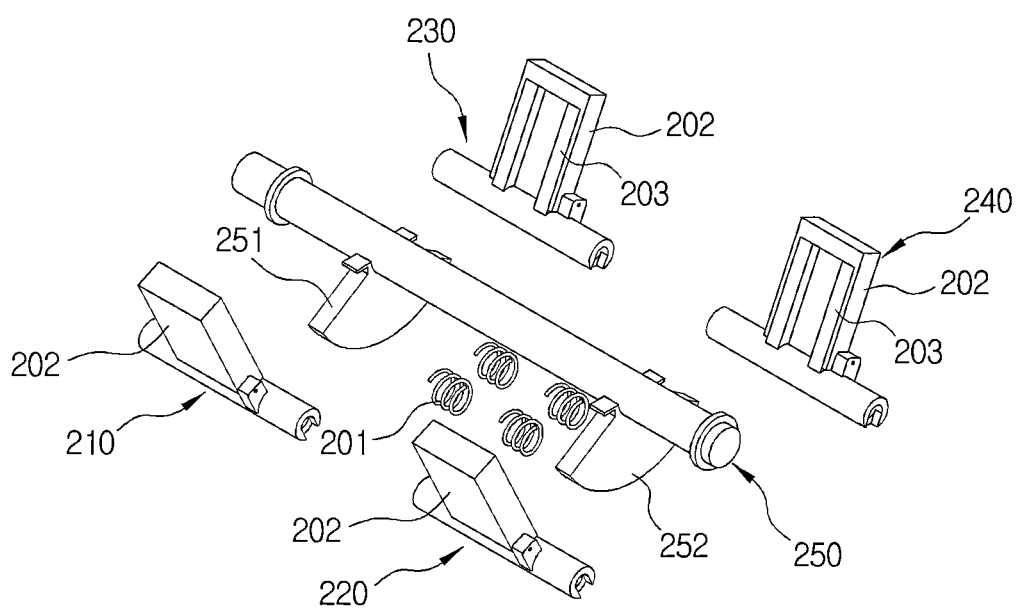
FIG. 6 is a diagram showing an opening and closing means of an apparatus for generating perfume for vehicles according another exemplary embodiment of the present invention.

In this case, the first door 210 to the fourth door 240 are formed with guide parts 203 having protruded both sides in an area in which the first opening and closing part 251 or the second opening and closing part 252 move by the rotation of the rotating shaft 250 so as to guide the movement of the first opening and closing part 251 or the second opening and closing part 252 (see FIG. 6).

FIGS. 9 to 12 show an example in which the opening and closing means 200 opens and closes the first door 210 to the fourth door 240 by the rotation of the rotating shaft 250 by connecting the rotating shaft 250 with the first door 210 to the fourth door 240 by the connection member 204.

In this case, the rotating shaft 250 is provided with the first opening and closing part 251 that can simultaneously close the first door 210 and the third door 230 in the fan shape and the second opening and closing part 252 that can simultaneously close the second door 220 and the fourth door 240 in a fan shape so as to increase the sealing ability of the first door 210 to the fourth door 240 and the spring 201 maintained to close the first channel 131 to the fourth channel 134 is interposed between the first door 210 to the fourth door 240.

The first opening and closing part 251 and the second opening and closing part 252 are the same as the form shown in FIGS. 2 to 8. Further, the first door 210 to the fourth door 240 may also be further provided with guide parts 203 (see FIG. 12).

Meanwhile, the apparatus 1000 for generating perfume for vehicles according to the present invention can easily change a type of perfume according to the user's taste and easily replace perfume as the lower portion of the body 100 is opened and the first perfume generating part 110 and the second perfume generation part 120 are formed in a cartridge form.

Further, the air channel forming part 130 is to more increase the sealing ability by mounting the second sealing members 101 on each of the lower portions of the first channel 131 to the fourth channel 134 contacting the first hole 111 to the fourth hole 122. (the second sealing member 101 is provided between the first channel 131 to the fourth channel 134 through which the first hole 111 and the second hole 112 of the first perfume generating part 110 communicate with the third hole 121 and the fourth hole 122 of the second perfume generating part 120).

FIGS. 7A to 8B are diagrams showing the operation of the apparatus 1000 for generating perfume for vehicles according to the exemplary embodiment of the present invention.

Figure 7A:
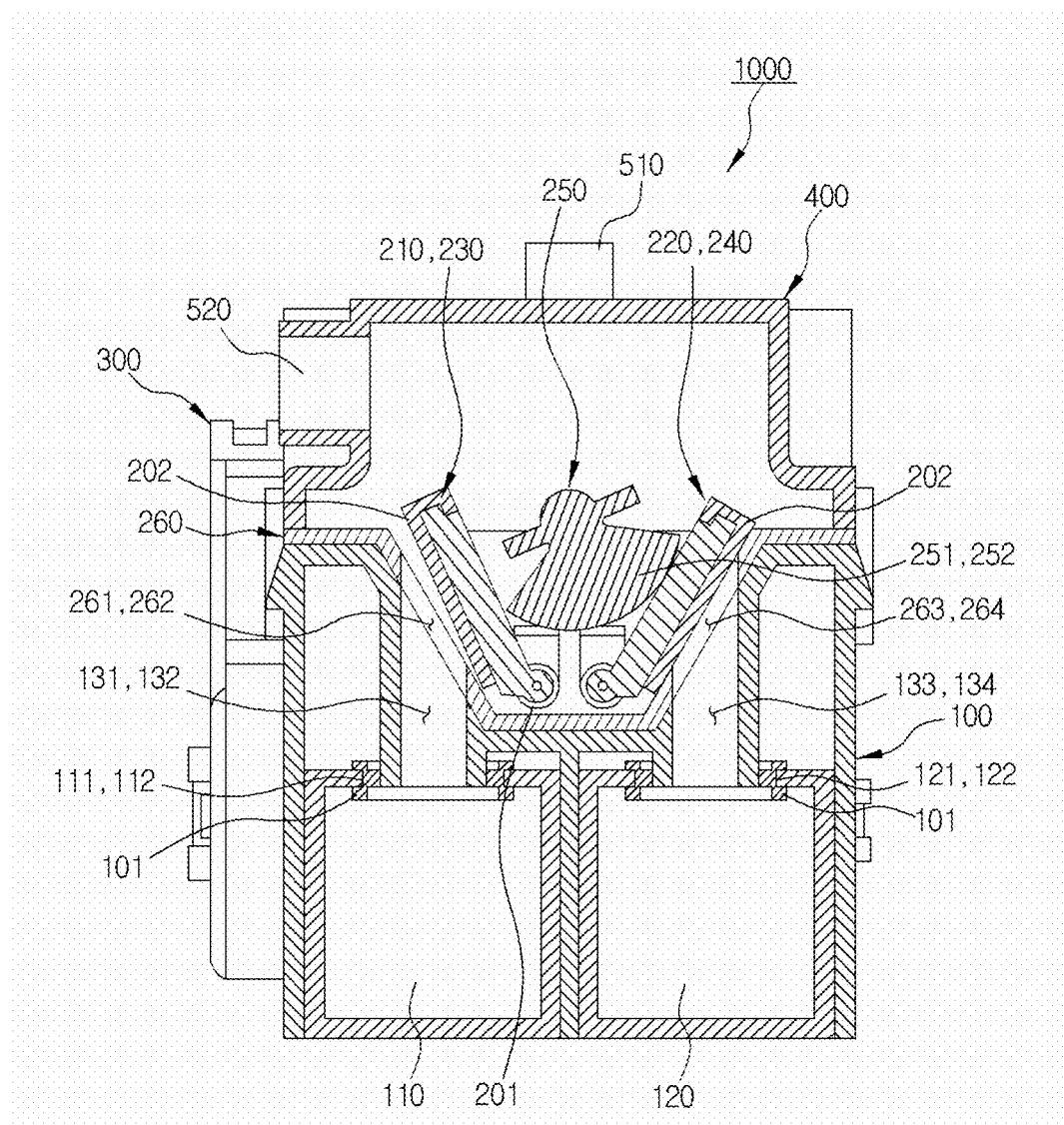
FIG. 7A is a cross-sectional view for describing the operation of the opening and closing means.
Figure 7B:
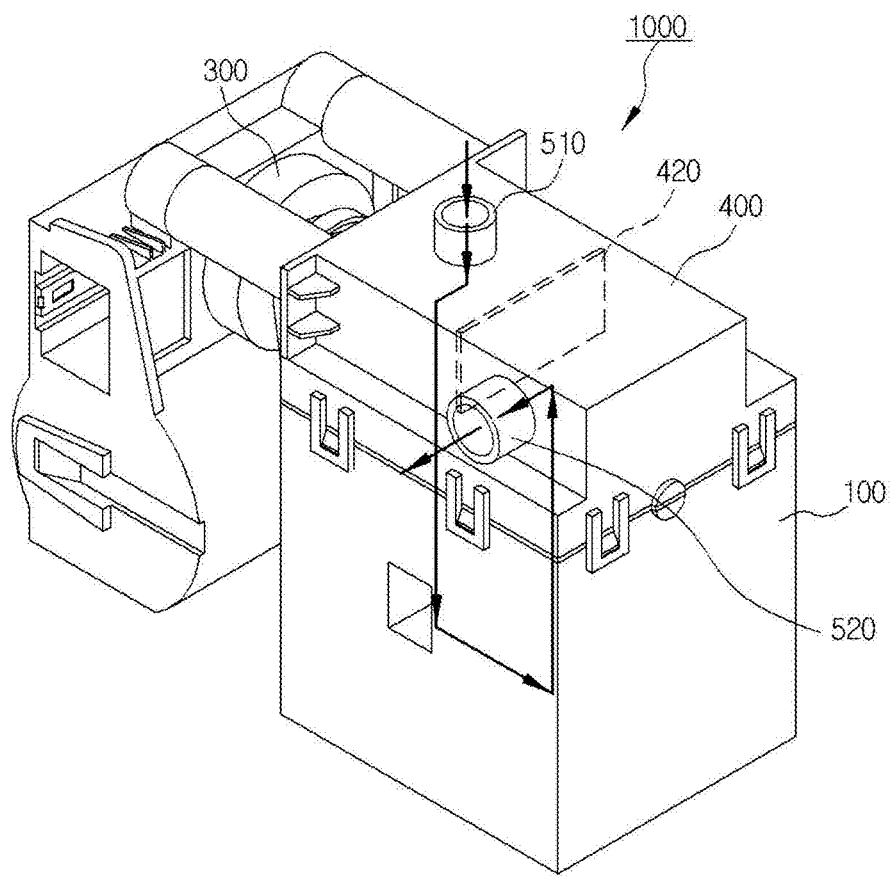
FIG. 7B is a diagram showing the flow of air in the state of FIG. 7A.

First, FIG. 7A is a cross-sectional view for describing the operation of the opening and closing means 200 and FIG. 7B shows the flow of air in the state of FIG. 7A.

The apparatus 1000 for generating perfume for vehicles according to the exemplary embodiment of the present invention shown in which the rotating shaft 2501 in FIGS. 7A and 7B show an example s rotated counterclockwise based on the fixed position of the cross-sectional view shown in FIGS. 4 and 5 to open the first door 210 and the second door 220 and close the third door 230 and the fourth door 240.

In this case, reviewing the flow of air, the air introduced into the first space part 401 of the cover 400 through the inlet pipe 510 moves to the first perfume generating part 110 through the first communicating hole 261 of the door seating member 260, the first channel 131 of the air channel forming part 130, and the first hole 111 as the first door 210 and the second door 220 are opened and again moves to the second space part 402 of the cover 400 along the second hole 112, the second channel 132 of the air channel forming part 130, and the second communicating hole 262 of the door seating member 260 and is discharged through the outlet pipe 520.

That is, the air shown in FIGS. 7A and 7B are discharged to the outside through the first perfume generating part 110.

Figure 8A:
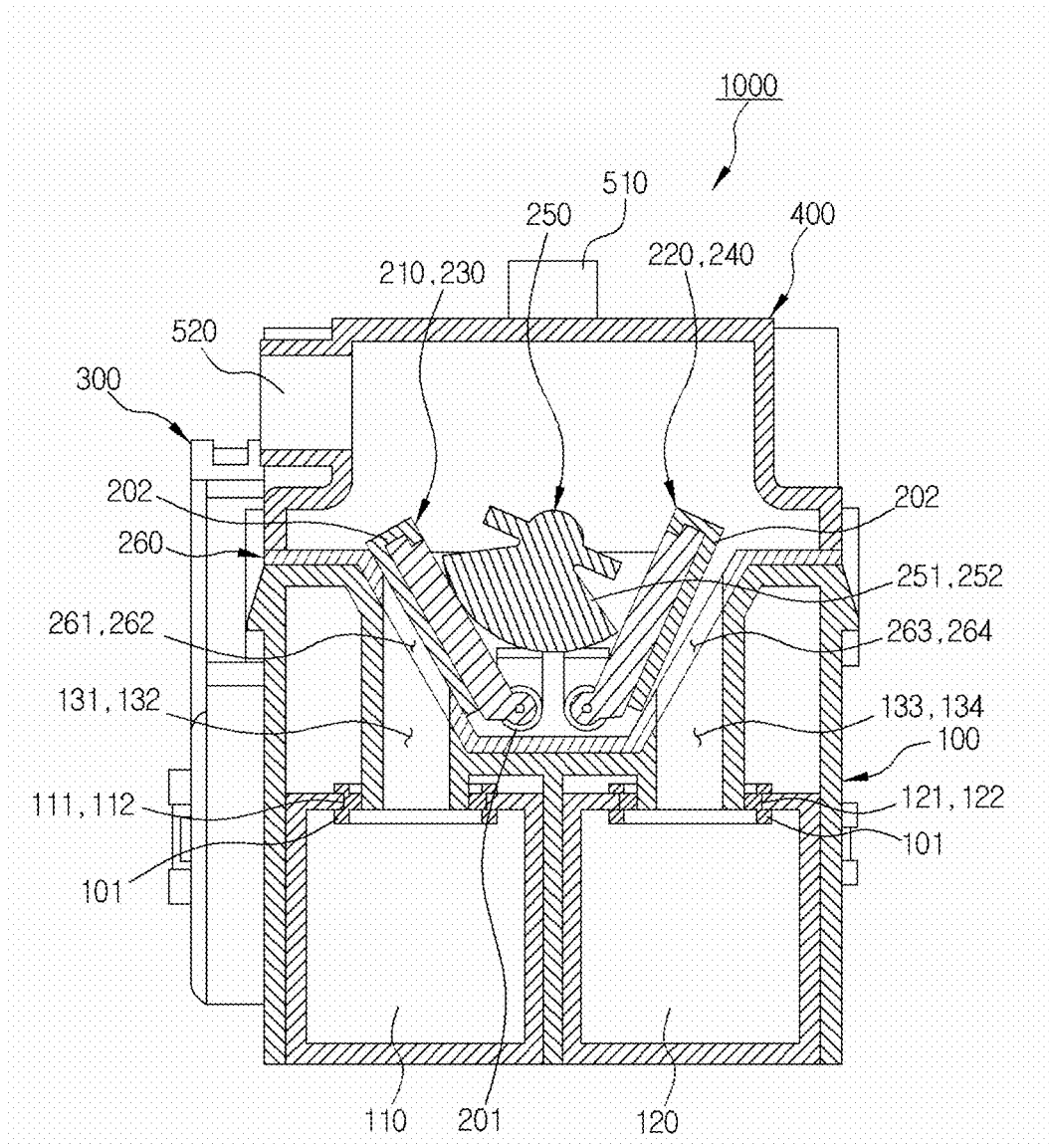
FIG. 8A is a cross-sectional view for describing the operation of the opening and closing means.
Figure 8B:
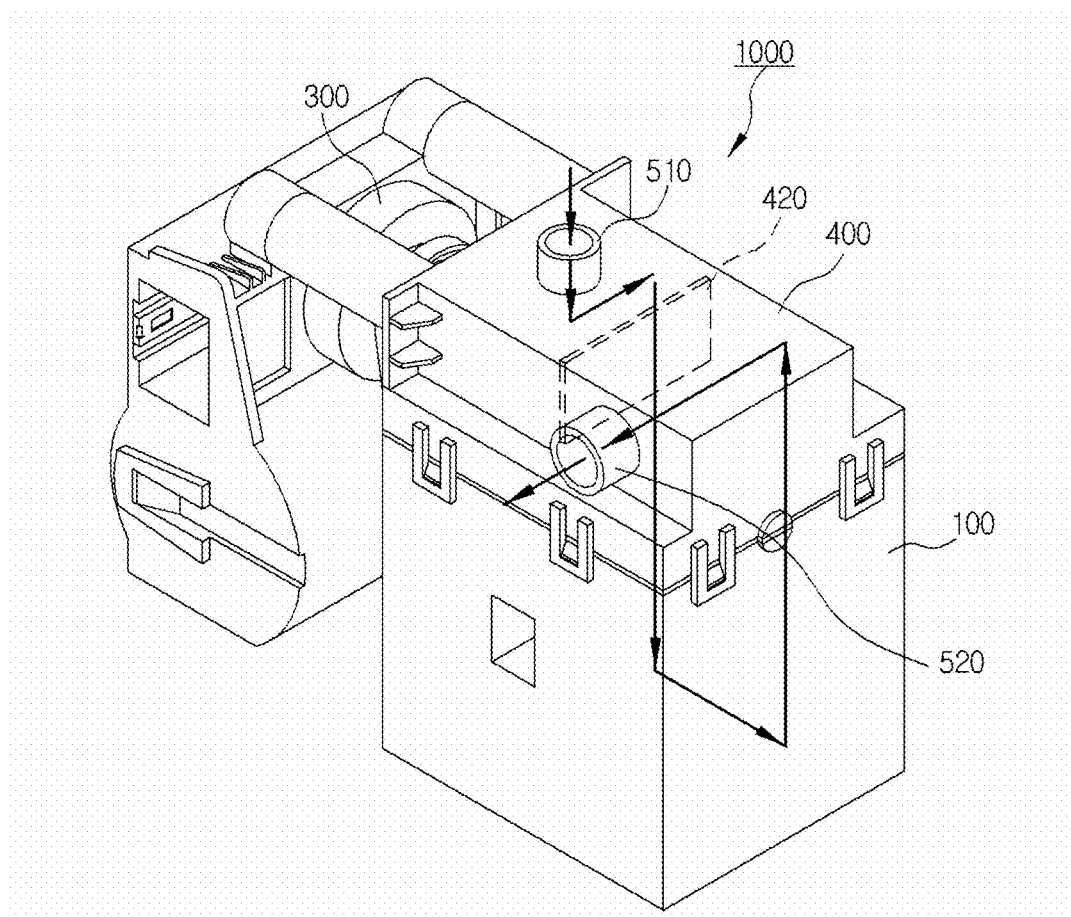
FIG. 8B is a diagram showing the flow of air in the state of FIG. 8A.
Figure 9:
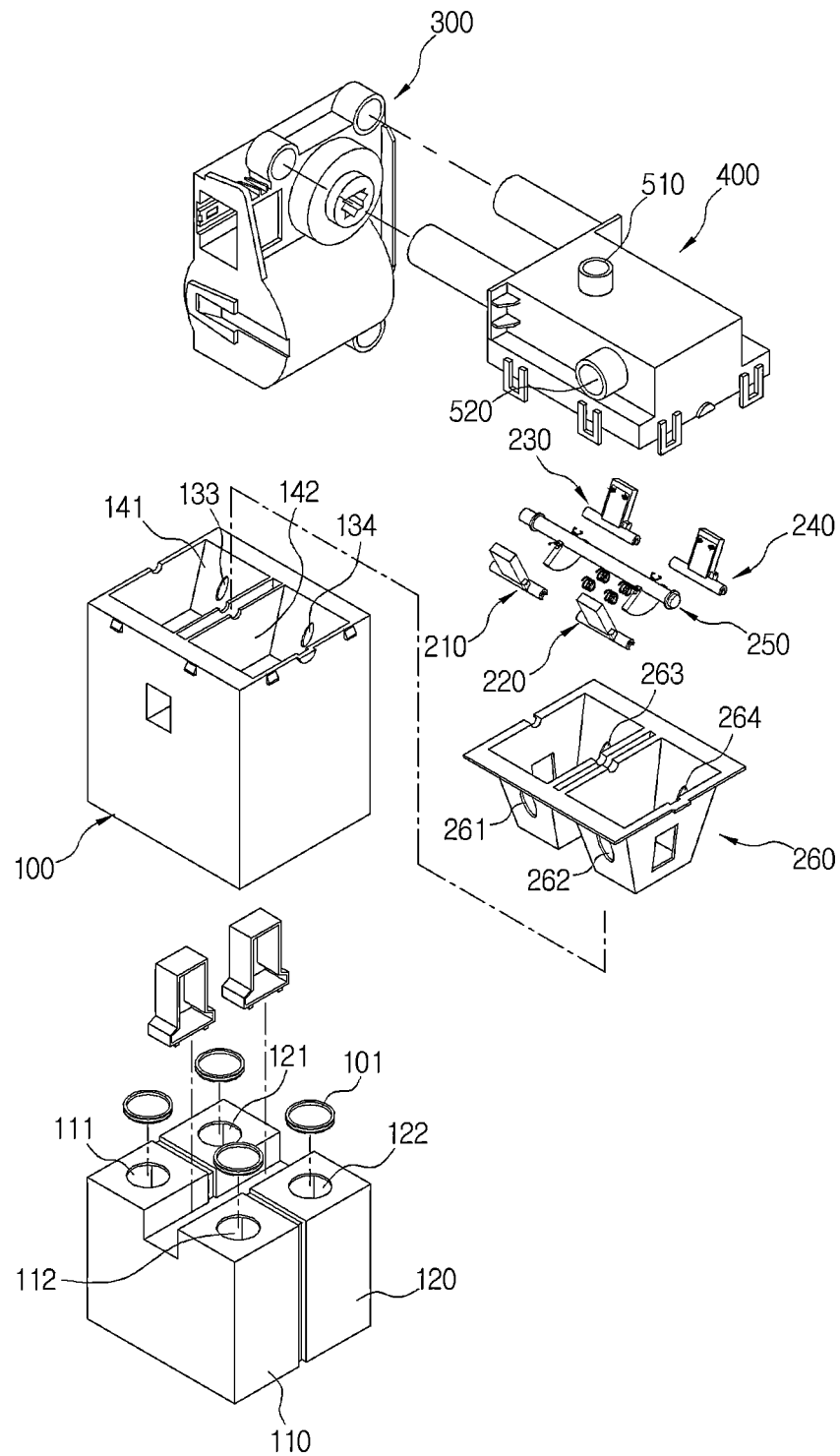
FIGS. 9 to 11 are an exploded perspective view of an apparatus for generating perfume for vehicles according to another exemplary embodiment of the present invention and a diagram showing an operation thereof.
Figure 10:
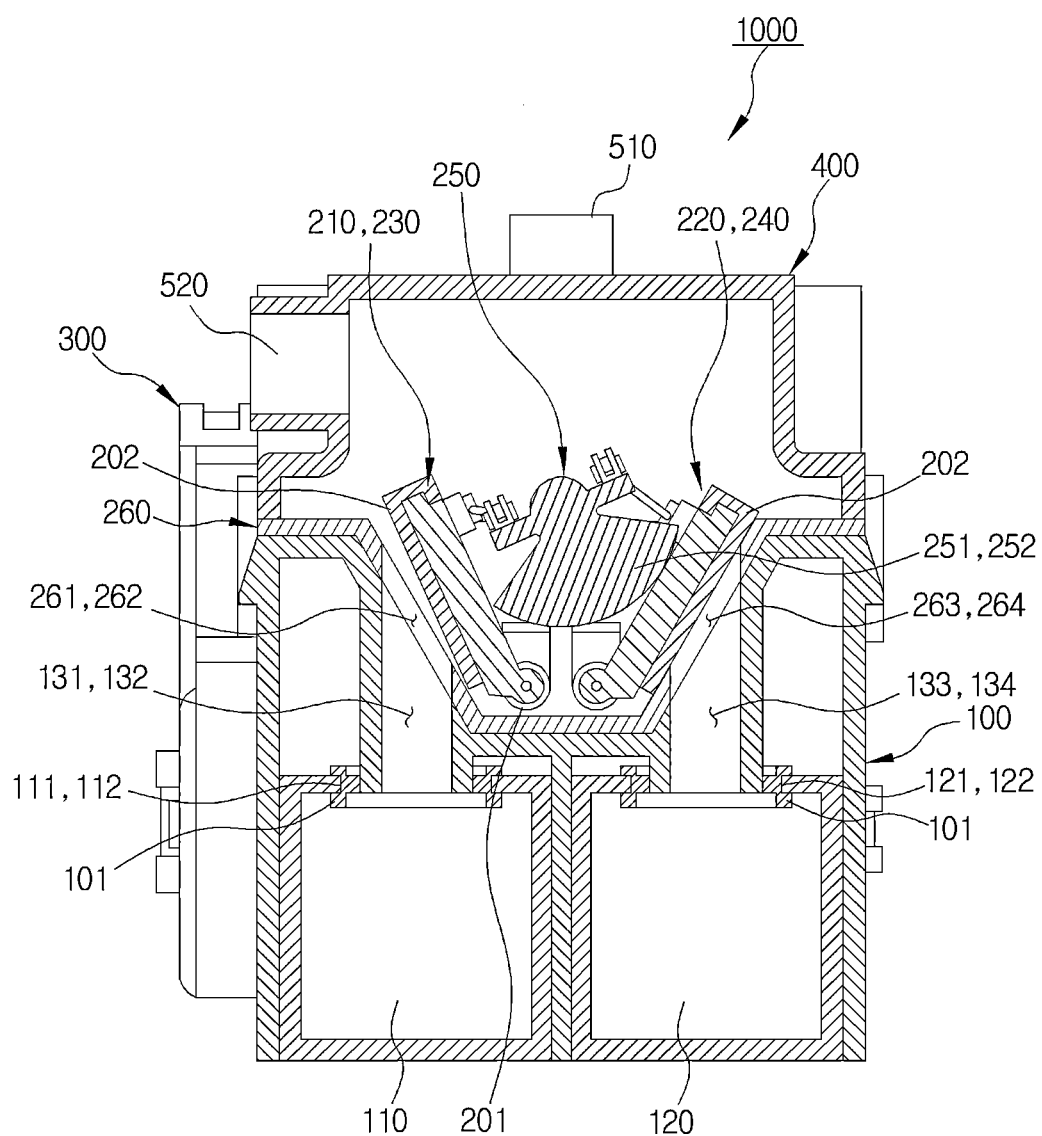
Figure 11:
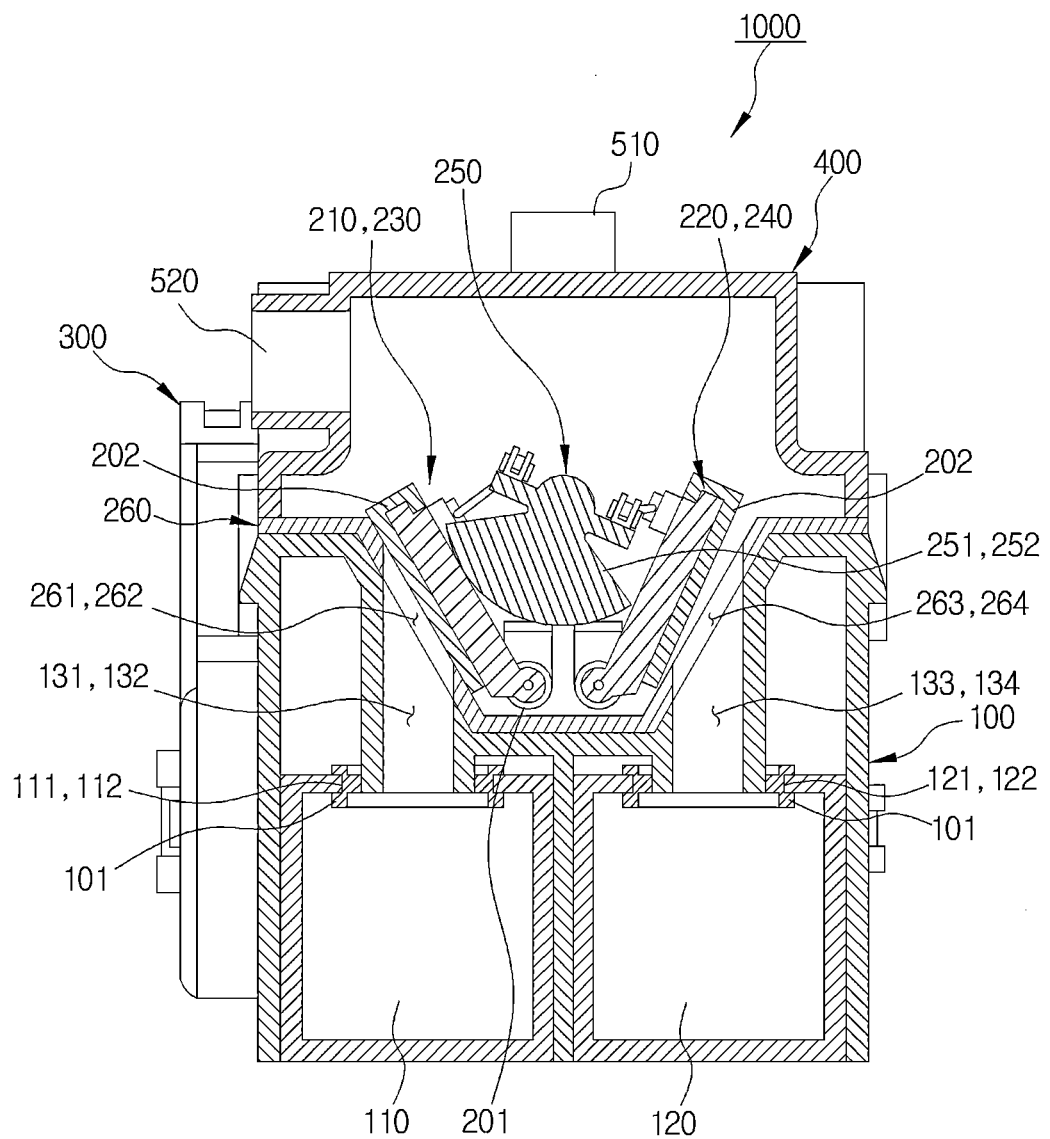
Figure 12:
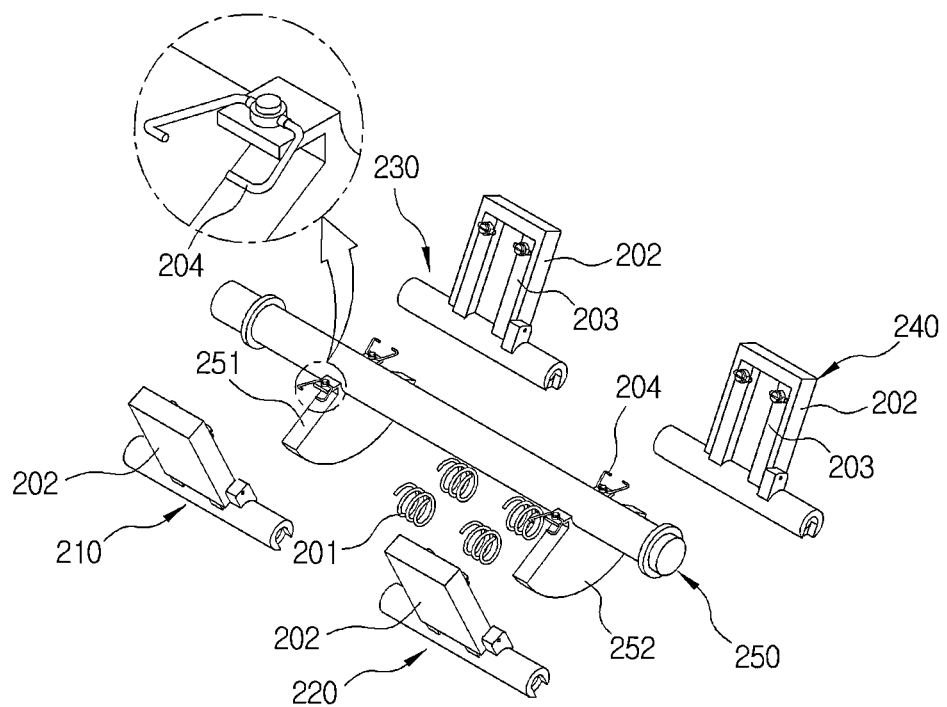
FIG. 12 is a diagram showing an opening and closing means of an apparatus for generating perfume for vehicles according to another exemplary embodiment of the present invention.

In addition, the apparatus 1000 for generating perfume for vehicles according to the exemplary embodiment of the present invention shown in FIGS. 8A and 8B show an example in which the rotating shaft 250 is rotated clockwise based on the fixed position of the cross-sectional view shown in FIGS. 4 and 5 to close the first door 210 and the second door 220 and open the third door 230 and the fourth door 240. In this case, the air introduced thereinto is discharged to the outside through the second perfume generating part 120.

In more detail, the air introduced into the first space part 401 of the cover 400 through the inlet pipe 510 moves to the second perfume generating part 121 through the third communicating hole 263 of the door seating member 260, the third channel 133 of the air channel forming part 130, and the third hole 121 as the third door 230 and the fourth door 240 are opened and again moves to the second space part 402 of the cover 400 along the fourth hole 122, the fourth channel 134 of the air channel forming part 130, and the fourth communicating hole 264 of the door seating member 260 and is discharged through the outlet pipe 520.

Figure 13:
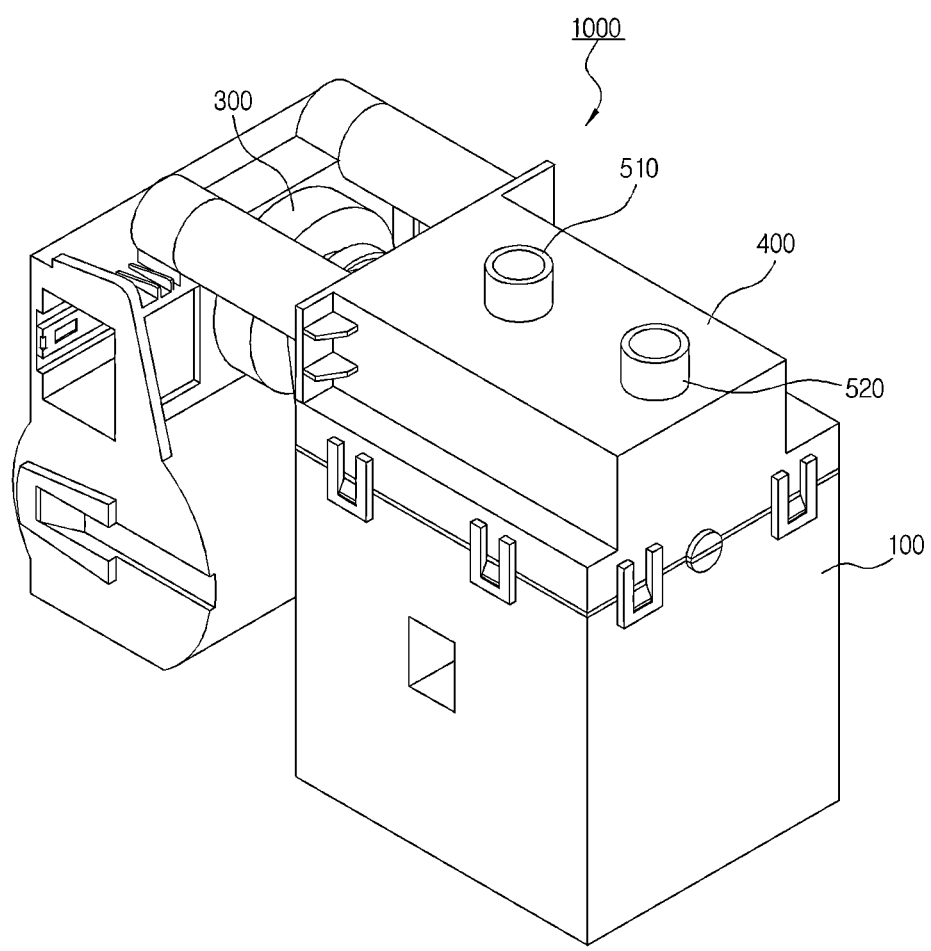
FIG. 13 is a diagram showing an apparatus for generating perfume for vehicles according another exemplary embodiment of the present invention.

In the apparatus 1000 for generating perfume for vehicles according to the exemplary embodiment of the present invention shown in FIG. 13, an example in which the inlet pipe 510 and the outlet pipe 520 are located above of the upper cover 400 and are each located in the central areas of the first space parts 401 and 402 is shown.

The rotating shaft 250 is one and is extended over the first space part 401 and the second space part 402 and therefore, the central area of the first space part 401 and the second space part 402 correspond to the upper portion of the rotating shaft 250.

In this case, it is preferable to form the inlet pipe 510 and the outlet pipe 520 at the same size.

Figure 14:
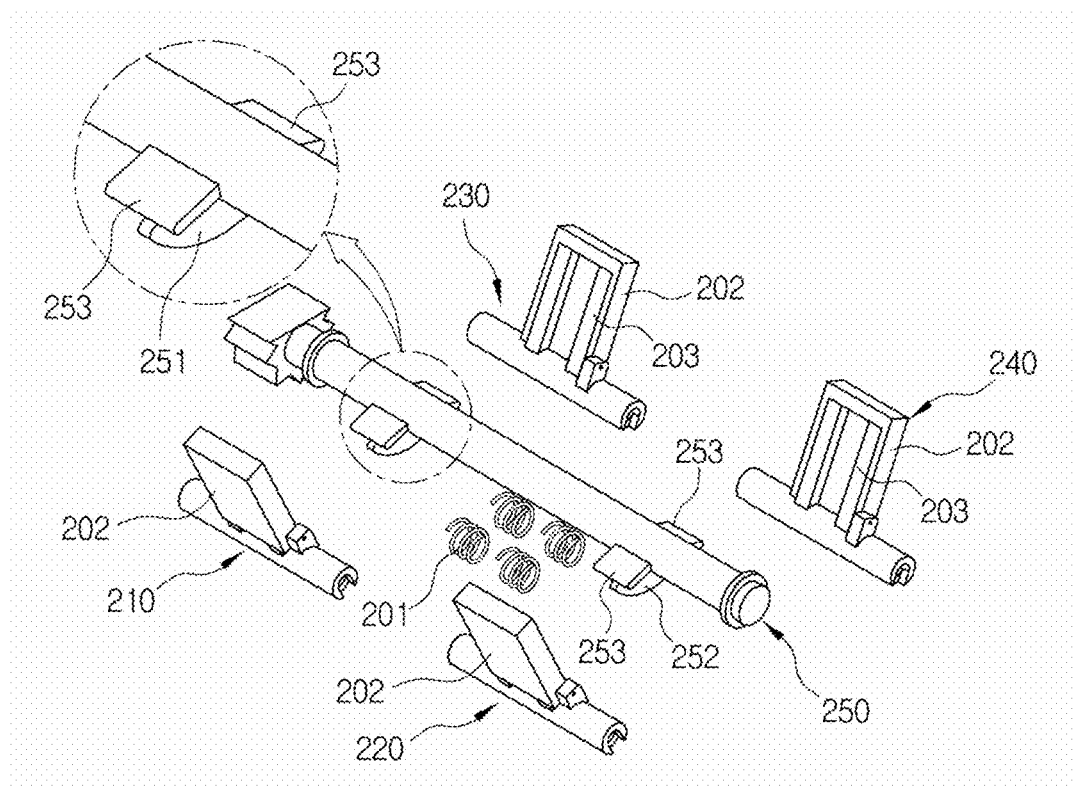
FIGS. 14 and 15 are a partially exploded perspective view and a cross-sectional view of an apparatus for generating perfume for vehicles according to the present invention.
Figure 15:
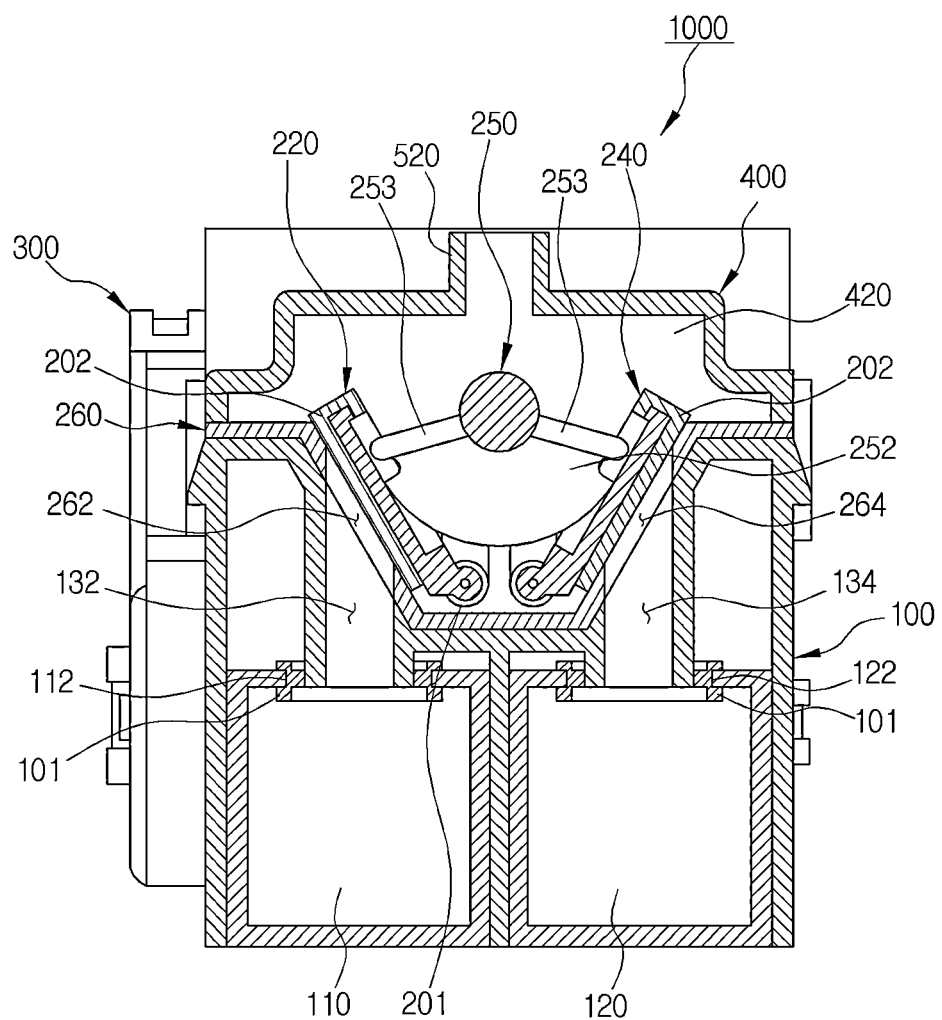

In the apparatus 1000 for generating perfume for vehicles according to the exemplary embodiment of the present invention shown in FIG. 13, the remaining component other than the formation location of the outlet pipe 520 and the size of the inlet pipe 510 and the outlet pipe 520 may be applied to the exemplary embodiment of various forms shown in FIGS. 2 to 12 and may be a form shown in FIGS. 14 and 15.

The form shown in FIGS. 14 and 15 is the same as the form shown in FIG. 6 but shows the example in which the rotating shaft 250 of the opening and closing means 200 is further provided with guide members 253.

The guide member 253 is formed in pair in a plate shape protruded to both sides of the rotating shaft 250 corresponding to the inlet pipe 510 or the outlet pipe 520 and the flow of air introduced from the inlet pipe 510 or the flow of air discharged to the output pipe 520 are guided by the rotation of the rotating shaft 250.

In this case, in the apparatus 1000 for generating perfume for vehicles according to the exemplary embodiment of the present invention, the inlet pipe 510 or the outlet pipe 520 may be preferably formed above the rotating shaft 250 so as to more increase the guide effect of the flow of air by the guide member.

In addition, the guide members 253 may be each formed on both sides of one of the first opening and closing part 251 and the second opening and closing part 252 when the opening and closing means 200 is provided with the first opening and closing part 251 and the second opening and closing part 252 or may each be formed on both sides of both of the first opening and closing part 251 and the second opening and closing part 252.

In the exemplary embodiment of the present invention, both sides of the first opening part 251 and the second opening part 252 mean a radius portion in a section having a fan shape.

In other words, the apparatus 1000 for generating perfume for vehicles according to the exemplary embodiment of the present invention includes the guide member 253 to guide the air introduced through the inlet pipe 510 and the air discharged through the outlet pipe 520, thereby more smoothing the flow of air.

As described above, the apparatus 1000 for generating perfume for vehicles according to the exemplary embodiment of the present invention can reduce the air pressure drop by locate the inlet pipe 510 at the center of the first space part 401 of the upper cover 400, easily control the flow of air passing through the first perfume generating part 110 and the second perfume generating part 120 using the single rotating shaft 250, thereby simplifying the configuration and increasing the sealing ability to stably control perfume.

The apparatus for generating perfume for vehicles according to the exemplary embodiments of the present invention can easily control the flow of air through the first perfume generating part and the second perfume generating part using the single rotating shaft, thereby simplifying the configuration and increasing the sealing ability to stably control the perfume.

In detail, the apparatus for generating perfume for vehicles can open and close the first door to the fourth door by the rotation of the rotating shaft.

Further, the apparatus for generating perfume for vehicles can include the door seating member, mount the first sealing member on the surface on which the first door to the fourth door contact the door seating member, and mount the second sealing member under the first channel to the fourth channel, thereby increasing the sealing ability.

In addition, the apparatus for generating perfume for vehicles can mount the inlet pipe and the outlet pipe on the corresponding cover above the rotating shaft and form the plate-shaped guide member on the rotating shaft, thereby smoothing the introduced flow of air introduced through the inlet pipe and the flow of air discharged through the outlet pipe and reducing the pressure drop of air.

Moreover, the apparatus for generating perfume for vehicles can mount the inlet pipe above the cover, thereby smoothing the introduced flow of air by reducing the pressure drop of air introduced through the inlet pipe, reducing the pressure drop of air, reducing the difference in intensity of two perfumes perfumed through the first perfume generating part and the second perfume generating part, and increasing the overall air volume.

Also, the apparatus for generating perfume for vehicles can detachably form the lower portion of the body due to the lower cover and form the first perfume generating part and the second perfume generating part in the cartridge form, thereby easily changing the type of perfume and easily replacing perfume according to a user's taste.

The present invention is not limited to the above-mentioned exemplary embodiments, and may be variously applied, and may be variously modified without departing from the gist of the present invention claimed in the claims.

What is claimed is:

1. An apparatus for generating perfume for vehicles, comprising:
   a body having a first perfume generating part and a second perfume generating part embedded in parallel therein, an upper one portion of the first perfume generating part is provided with a first hole and the upper other portion thereof is provided with a second hole and an upper one portion of the second perfume generating part is provided with a third hole and a fourth hole;
   an air channel forming part including a first channel communicating with the first hole of the first perfume generating part, a second channel communicating with the second hole of the first perfume generating part, the third channel communicating with the third hole of the second perfume generating part, and a fourth channel communicating with the fourth hole of the second perfume generating part;
   an opening and closing means including a first door to a fourth door opening and closing the first channel to the fourth channel, respectively, and a single rotating shaft controlling an opening and closing of the first door to the fourth door;
   an actuator connected with the rotating shaft of the opening and closing means to axially rotate the rotating shaft; and
   a plurality of springs, at least one spring of the plurality of springs connected with a corresponding one of the first door to the fourth door and configured to open the first channel to the fourth channel,
   wherein the opening and closing means is configured to open and close the first door to the fourth door by the rotation of the rotating shaft by forming with a first opening and closing part simultaneously closing the first door and the third door and a second opening and closing part simultaneously closing the second door and the fourth door each on the rotating shaft being formed in parallel with each other in a fan shape.

2. The apparatus of claim 1, further comprising:
a cover fastened with the body and including a first space part communicating the first channel and the third channel and a second space part communicating with the second channel and the fourth channel partitioned thereon.

3. The apparatus of claim 2, wherein the cover is provided with an inlet pipe and an outlet pipe each connected to the first space part and the second space part so as to introduce and discharge air.

4. The apparatus of claim 3, wherein the air channel forming part is provided with an inclined part to be inclined between the first perfume generating part and the second perfume generating part as upper sections of the first channel to the fourth channel go downwardly.

5. The apparatus of claim 4, wherein the air channel forming part is protrudedly provided with a partition part partitioning a space in which the first space part and the second space part communicate with each other, upwardly from the inclined part.

6. The apparatus of claim 5, wherein the opening and closing means is provided with a door seating member that is mounted between the air channel forming part and the first door to the fourth door so as to correspond to an upper portion of the air channel forming part provided with the inclined part and the partition part and is provided with a first communicating hole communicating with the first channel, a second communicating hole communicating with the second channel, a third communication hole communicating with the third channel, and a fourth communicating hole communicating with the fourth channel.

7. The apparatus of claim 6, wherein a plate-shaped first sealing member is integrally formed on a surface on which the first door to the fourth door each contact the door seating member.

8. The apparatus of claim 1, wherein the first door to the fourth door are protrudedly provided with guide parts guiding a movement of the first opening and closing part or the second opening and closing part according to the rotation of the rotating shaft.

9. The apparatus of claim 3, wherein the inlet pipe is located at a center of the first space part corresponding to an upper portion of the rotating shaft.

10. The apparatus of claim 9, wherein the outlet pipe is formed on a surface adjacent to the second channel of the second space part in a side of the cover, and
the inlet pipe is formed to be smaller than the outlet pipe.

11. The apparatus of claim 9, wherein the outlet pipe is located at a center of the second space part corresponding to the upper portion of the rotating shaft, and
the inlet pipe and the outlet pipe are formed at the same size.

12. The apparatus of claim 9, wherein the opening and closing means is provided with a pair of guide members in a plate shape protruded to both sides of the rotating shaft corresponding to the inlet pipe or the outlet pipe so as to guide the flow of air introduced from the inlet pipe or air discharged to the outlet pipe.

13. The apparatus of claim 1, wherein the body has an opened lower portion and the first perfume generating part and the second perfume generating part are replaceably formed in a cartridge form through the opened lower portion of the body.

14. The apparatus of claim 13, further comprising:
second sealing members formed on each of the lower portions of the first channel to the fourth channel contacting the first hole to the fourth hole of the air channel forming part.

* * * * *